United States Patent
Iannazo et al.

[11] Patent Number: 5,882,204
[45] Date of Patent: Mar. 16, 1999

[54] FOOTBALL INTERACTIVE SIMULATION TRAINER

[75] Inventors: Dennis J. Iannazo, Fort Worth; James W. Lacy, 202 Mockingbird, Weatherford, both of Tex. 76086; Cheryl J. White, Tijeras, N. Mex.

[73] Assignees: Dennis J. Lannazzo; James W. Lacy, both of Fort Worth, Tex.

[21] Appl. No.: 501,896

[22] Filed: Jul. 13, 1995

[51] Int. Cl.⁶ .................................................. A63B 69/00
[52] U.S. Cl. ...................... 434/251; 434/247; 473/422; 473/438
[58] Field of Search ...................... 434/247–249, 434/251, 252; 367/90, 101, 907; 342/126; 473/152, 156, 438, 439, 446, 455, 422; 364/410

[56] References Cited

U.S. PATENT DOCUMENTS

| | | | |
|---|---|---|---|
| 4,160,942 | 7/1979 | Lynch et al. | 434/252 X |
| 4,751,642 | 6/1988 | Silva et al. | 473/152 X |
| 5,138,322 | 8/1992 | Nuttall | 342/126 |
| 5,553,846 | 9/1996 | Frye et al. | 473/455 |

OTHER PUBLICATIONS

Full Swing Golf Simulators (Brochure), Published 1994 by Litho USA.

*Primary Examiner*—Richard J. Apley
*Assistant Examiner*—John Mulcahy
*Attorney, Agent, or Firm*—James E. Bradley

[57] ABSTRACT

A football interactive simulation trainer for quarterbacks and kickers provides true perspective views of a simulated playing area during practice plays, as would be seen by a training player on a regulation size football field during an actual play. The trainer includes a sonic tracking system which has a plurality of ultrasonic transducers spaced apart around the perimeter of an actual playing area for detecting positions of the training player and motion of the football during a practice play. The transducers are selectively grouped and directed in selected directions to establish regions of overlap so that several of the transducers will simultaneously detect the positions of the training player and several of the transducers will simultaneously detect the motion of the football. A data processing system receives data signals from the transducers, and determines the positions of the training player and the trajectory of the football within the actual playing area. Reactions of the simulated players to the different positions of the training player are determined, and video images are projected onto the video display wall with changing values of magnification and lines of sight to provide the training player with the true perspective views of the simulated playing area. The data processing system also projects the trajectory of the football into the simulated playing area, and video images are projected on the video display wall of the flight of the football, subsequent reactions of the simulated players to the trajectory of the football and the result of the play.

13 Claims, 8 Drawing Sheets

FOOTBALL INTERACTIVE SIMULATION TRAINER

BACKGROUND OF THE INVENTION

1. Field of the Invention

The field of invention relates in general to simulation trainers and position detection systems, and in particular to a football training simulator having a multi-frequency, narrowband ultrasonic radar tracking system.

2. Description of the Prior Art

Sports simulation trainers have been provided for training athletes and contestants for particular types of sporting events. One example of such a sports simulation trainer is a golf simulator. These prior art simulators have infrared position detection systems which detect the position at which a spherical ball in flight passes through a plane around which infrared detectors are positioned. Infrared light emitters are positioned around the plane and transmit infrared light beams across the plane to detectors which are positioned opposite of the infrared light emitters. A second set of infrared emitters and detectors may also be provided around a second plane. As a golf ball travels through one of the planes, it breaks one of the beams of infrared light and prevents the beam from passing across the plane to a detector, indicating the position at which the ball is passing through the plane.

These types of infrared position detection systems provide a general determination of the path and speed of a round golf ball between two points, yet they are not accurate enough to detect critical rotational and aerodynamic factors required to accurately determine the trajectory of an oblong object, such as a football. Current infrared position detection systems will not detect the motion of an object with enough accuracy to determine both the velocity of the object and other critical aerodynamic factors, such as the objects orientation, rotation, wobble and spin. Detection of these types of critical aerodynamic factors are required to determine the trajectory of a football with enough accuracy to provide an effective football simulation trainer for use by professional athletes.

SUMMARY OF THE INVENTION

A football interactive simulation trainer is provided for simulating real time, down field views of a football field for training quarterbacks and kickers during practice plays. A training field of play is provided which includes actual and simulated playing areas. The simulated playing area is displayed by a video projection system onto a video display wall to provide true perspective views of goal posts and simulated players, such as linemen, receivers and defensive backs, as would been seen by a training player on an actual, full size, regulation football field during the plays.

During one of the plays, the positions of the training player and motion of a football in the actual playing area are detected by a sonic tracking system having a plurality of ultrasonic transducers spaced apart around the perimeter of the actual playing area. The transducers are operated either in a pulse-echo mode or a continuous wave-doppler mode, with each of the transducers operating at one of several fixed narrowband ultrasonic signal frequencies. Sets of the transducers are selectively grouped and directed to establish regions of overlap so that the positions of the training player are simultaneously detected by several of the transducers within the regions of overlap. Motion of the football is simultaneously detected by several other transducers within the regions of overlap. A data processing system receives data signals from the transducers and then, by triangulation, determines the positions of the training player and the trajectory of the football within the actual playing area during the play. From the positions of the training player, the data processing system determines the initial reactions of the simulated down field players to the different positions of the training player and the perspective views of the simulated playing area, as would be seen by the training player on the regulation football field during the play. The data processing system projects the trajectory of the football into the simulated playing area and subsequent reactions of the simulated down field players to the trajectory of the football. The simulated down field players are driven with artificial intelligence to simulate the reactions of actual players.

During the play of the training player, visual images of the simulated playing area are projected onto the video display wall with changing values of magnification and lines of sight to provide the training player with the true perspective view of the simulated playing area, including the initial reactions of the simulated down field players. After the football is in flight, projection of the visual images onto the video wall are continued to show the football moving through the simulated playing area along the projected trajectory, the subsequent reactions of the simulated down field players and the result of the play.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
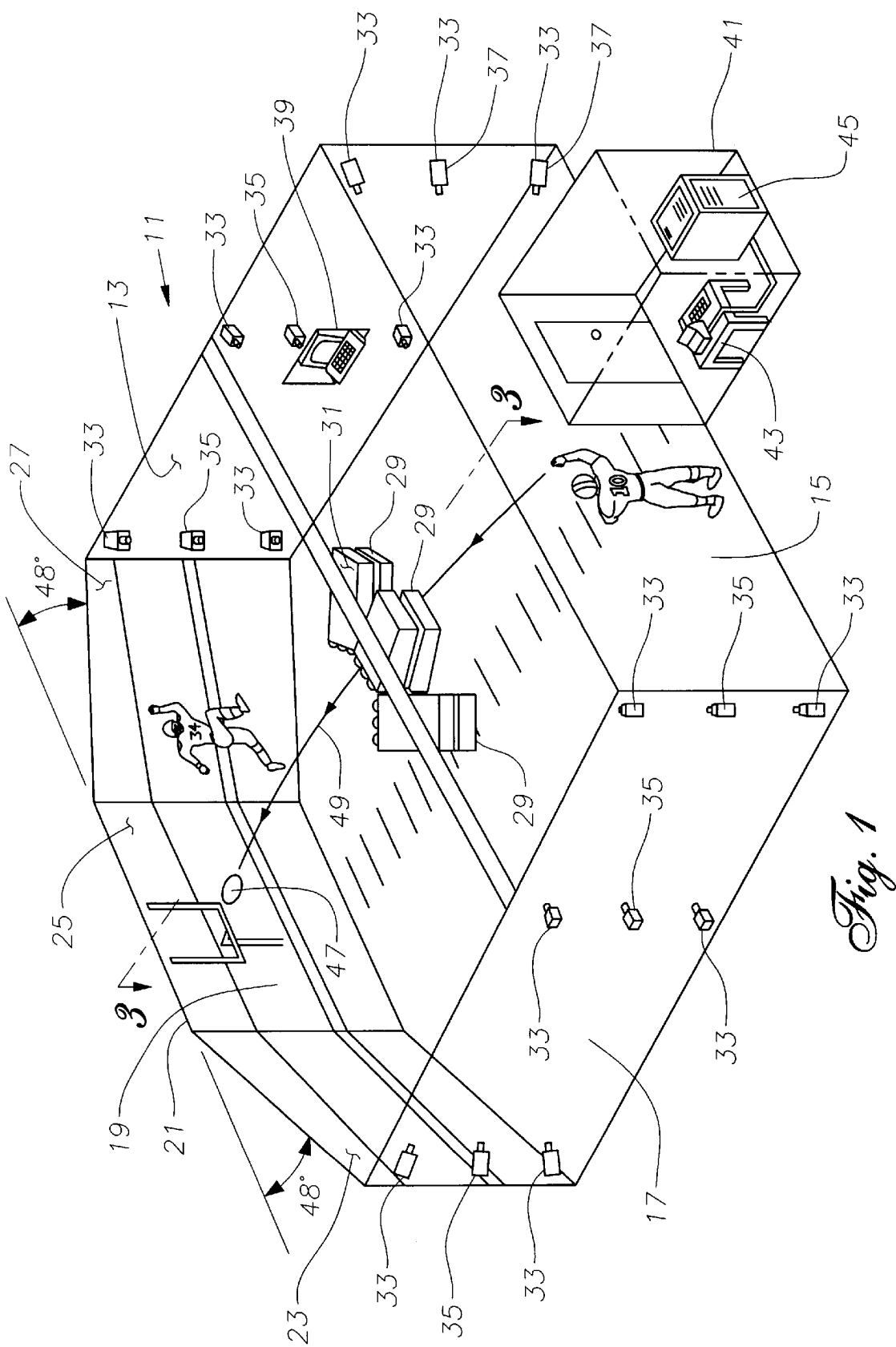
FIG. 1 is a perspective view of the sports simulation trainer of the present invention.

FIG. 1 is a perspective view which schematically depicts football simulation trainer 11 of the present invention, looking downward and toward the front of simulation trainer 11. Trainer 11 includes gallery 13 which has a length of 44 feet and a width of 28 feet, and which is preferably enclosed. Field of play 15 extends in gallery 13, and includes an actual playing area 17 and a simulated playing area 19. Actual playing area 17 preferably has astroturf and hash marks on the floor, similar to a section of an actual football field. Simulated playing area 19 is provided by video wall 21 and appears as a continuation of playing area 17.

Video wall 21 extends across the down field end of gallery 13 and provides a life-size simulation 19 of the down field portion of a football field, from the perspective view of a training player. Video wall 21 has a height of 14 feet, and measures 20 feet across at its widest part. Video wall 21 is formed by three separate view screens, 23, 25 and 27, each a separate panel measuring 14 high and 9 feet wide. The three panels 23, 25 and 27 are joined at their long dimension to provide a continuous projection surface 14 feet high by 20 feet wide, extending from the top to the bottom, and almost completely across video wall 21. The two panels forming view screens 23 and 27 extend in a horizontal plane in directions which are angled forward of view screen 25, at an angle of 48 degrees between the widths of screen 23, 27 and the width of center screen 25, respectively.

Figure 2:
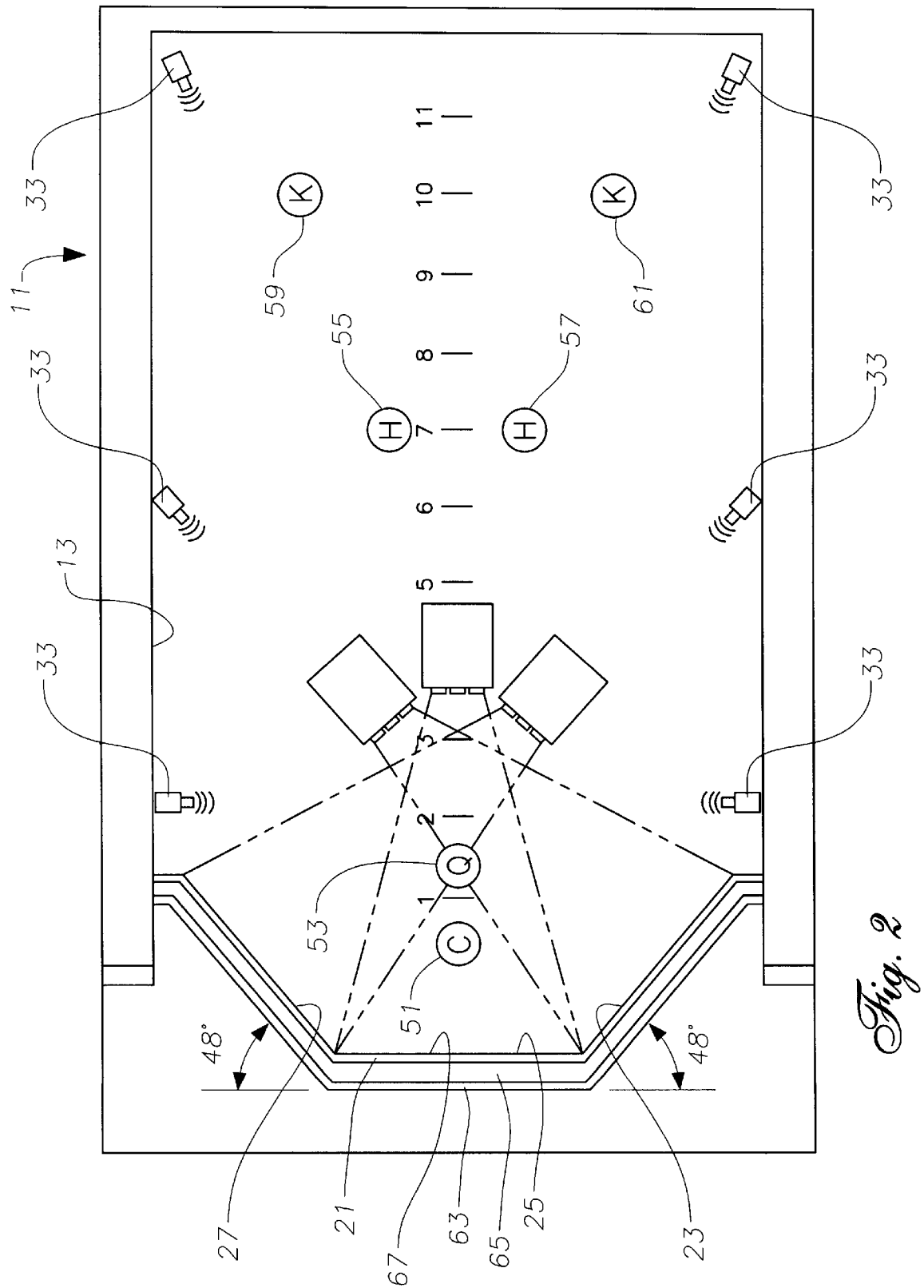
FIG. 2 is a top view of the sports simulation trainer of FIG. 1.

FIG. 2 is a top view of gallery 13 and shows the construction of view screens 23, 25, and 27 of video wall 21. Looking at view screen 23 from above, a rigid backing 63 is provided, such as fiber board or hard wood. Six (6) inch thick blocks of foam rubber 65 are mounted to backing 63 to provide a continuous shock absorbing backing for absorbing impact of a football hitting video wall 21. An outer cover 67 is provided by a canvas sail cloth, painted flat white to produce a screen gain of 1.0, giving normal diffuse reflection. View screens 23, 25 and 27 are provided by Alford Media, of Dallas, Tex.

Referring again to FIG. 1, projector bank 29 is mounted to the ceiling of gallery 13 and includes six separate video projectors 31. Video projectors 31 are currently available from BARCO Projection Systems, of Kuurne, BELGIUM, have model number of BarcoGraphics 808, are equipped with 8 inch CRT's and optics, and a light output at 10% peak white of 1,000 lumens. As discussed above, there are a total of six projectors, with two projectors each per projection screen 23, 25 and 27.

Projector bank 29 projects a continuous, life-size video image of the down field portion of a football field which extends completely across screens 23, 25 and 27 of video wall 21. Each of projectors 31 projects an image on one of view screens 23, 25 and 27. Projectors 31 are grouped in pairs, with one of the pair aligned above the other of the pair. Each projector in a grouped pair projects the same image to the same corresponding one of view screens 23, 25 and 27 to increase the brightness of the projected video image. This provides simulated playing area 19 with a realistic appearance.

The video image projected by projector bank 29 will be projected onto video wall 21 with values of magnification and lines of sight to provide a training player with a true perspective view of simulated playing area 19. This true perspective view is that which the training player would see if the practice play were actually being performed on an actual size, regulation football field, as the training player moves between various positions in a field of play. The magnification and line of site of the video image will be updated 30 times per second during a simulated practice play, based upon the various positions at which the training player is detected within actual playing area 17.

A sonic tracking system 32 is provided for detecting and analyzing motion of objects such as training players and the football in actual playing area 17. Tracking system 32 includes twelve sonic transducers 33 which are spaced apart around the perimeter of gallery 13, along the top and bottom of gallery 13. One of transducers 33 is at the top of each of the four corners of gallery 13, and at the bottom of each of the four corners of gallery 13. Additionally, four of sonic transducers 33 are provided midway between the front and rear of gallery 13, with one at the top and one at the bottom of each of the gallery sidewalls. Sonic transducers 33 are provided for tracking the motion of a football within gallery 13. Six sonic transducers 35 are provided at a mid-level height along the perimeter of gallery 13 for tracking the movement of a training quarterback or kicker. Sonic transducers 35 are each spaced apart between and vertically aligned with two of sonic transducers 33.

Remote user terminal 39 is provided for the training player, either a quarterback or kicker, to select specific plays and variations in the plays the training player wants to practice. Programming of specific plays will cause simulated receivers to run selected routes. Programming of specific plays will also select transducer groupings and transducers operating modes (either CW-Doppler or pulse-echo) and sequencing. Control room 41 is provided for an operator, and may be an enclosed room, outside of field of play 15. An operator control panel 43 is provided for an operator to input particular parameters into data processing system 45. Operator control panel 43 may be located in control room 41, or may be on an edge of field of play 15. An operator will primarily make defensive play calls, and may program receivers to run alternate routes and program deviations from the normal routes and defensive sets of selected plays. Data processing system 45 controls operation of gallery 13.

Football 47 is shown passing within field of play 15, in the actual playing area 17 with a trajectory 49. When the football 47 hits the video wall 21, it will then fall to the floor while a life-like simulation of continued play is displayed across video wall 21, as part of a true perspective view. The simulation will display a true perspective view of the continued flight of the football within simulated playing area 19.

Referring again to FIG. 2, a top view of gallery 13 depicts several initial, starting positions for players within the actual playing area 17. When a quarterback is being trained in simulator 11, typically the center will be located at position 51 and the quarterback will start the play at position 53. The quarterback may then drop back prior to throwing the ball. When football simulator 11 is being used for training place kickers, the center will again be at position 51. A holder may be at either of positions 55, 57, and the place kicker will start play from either of starting positions 59, 61.

Figure 3:
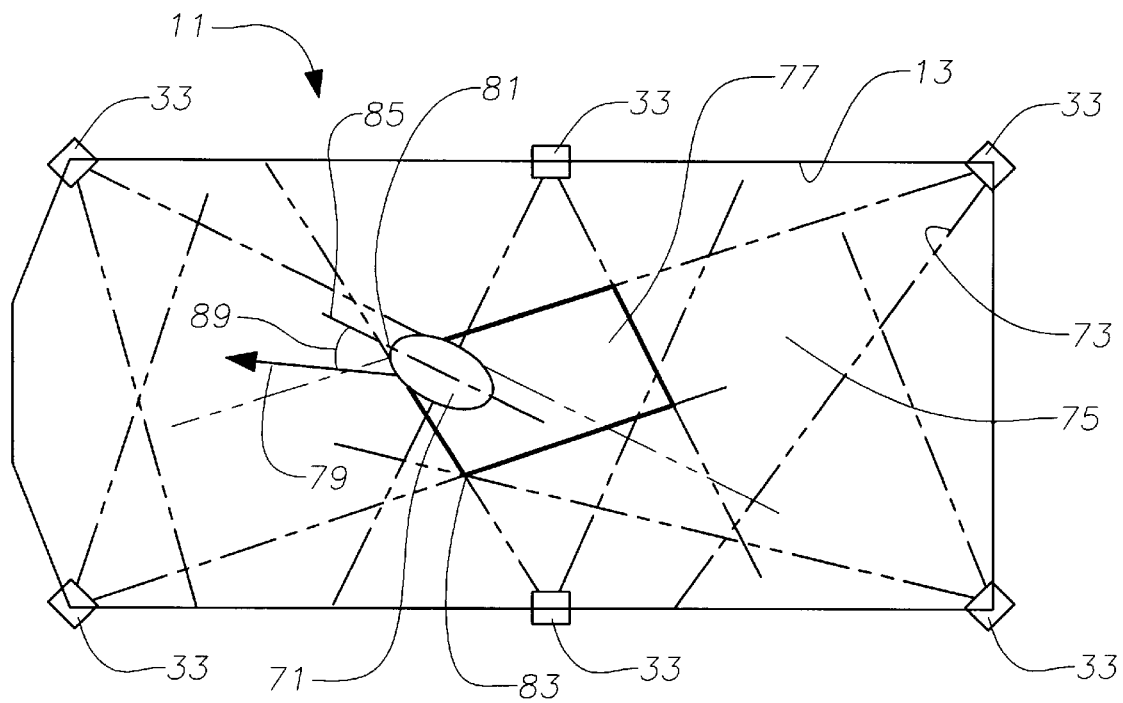
FIG. 3 is a sectional view taken along section line 3—3 of FIG. 1.

FIG. 3 is taken along section line 3—3 of FIG. 1, and depicts a horizontal section view of football 71 in flight and passing through actual playing area 17. Signals 73 are emitted from each of the transducers 33 at narrowband frequencies in the 30 kilohertz (kHz) to 150 kilohertz (kHz) range. Preferably, adjacent ultrasonic transcuers 33, 35 (shown in FIG. 2) are configured to emit ultrasonic signals at different frequencies from each other, so that the position of the football can be measured simultaneously by several transducers without ambiguity or interference between transducers. Thus, each of the particular narrowband frequencies which are emitted will correspond to particular ones of the transducers so that a return signal can be identified as being emitted by a particular transducer by its detected frequency. The transducers are available from AIRMAR Technology Corporation, of Milford, N.H. at various ones of selectable frequencies in the range 30 to 150 kHz range.

Sonic transducers 33 each have a field of view 75 which overlaps with selected others of transducers 33 in a region of overlap 77, which is shown as the cross-hatched portion of FIG. 3. Sonic transducers 33 are directed to face in selected directions so that the fields of view, or detection cones, of a selected grouping of the transducers are arranged so that they overlap. This arrangement is such that the trajectory of the football passes through this region of overlap and is "viewed" by several transducers simultaneously. A football 71 passing through region of overlap 77 will reflect the ultrasonic signals 73 back toward the sonic transducer which emitted the particular ultrasonic signal. The reflected portions of sonic signal 73 provide return (echo) sonic signals. Other embodiments of the present invention may have separate emitter transducers and receiver transducers. However, in the preferred embodiment, sonic transducers 33, 35 are operated in either a short burst pulse-echo mode, or continuous wave (cw)-doppler mode, in which each transducer is operated as both a transmitter transducer and a detector transducer. Thus, the same transducer emits sonic signals and then listens for the return signals from the sonic signals it emitted.

The transducers are selectively operated in two modes, a short burst pulse-echo mode and a continuous wave (cw)-doppler mode. In both operating modes, the transducers each emit an ultrasonic signal and then listen for returns from the ultrasonic signal it emitted. In the short burst pulse-echo mode transducers emit short bursts of ultrasonic signals at fixed narrowband ultrasonic frequencies. Each burst is a continuous periodic type of signal, preferably a sinusoidal signal, at the fixed emission frequency, with an adjustable burst duration typically set at approximately 350 microseconds. The pulse width of the bursts herein being defined by the burst duration. In the cw-doppler mode the transducers preferably emit continuous periodic ultrasonic signal frequencies, preferably a sinusoidal signal, over a time period lasting from 10 to 1000 milliseconds, at fixed narrowband ultrasonic frequencies. In the cw-doppler mode the reflected return ultrasonic signal from each transducer is compared to the signal from a stable local reference oscillator selected to match the transmission frequency of that transducer. One reference oscillator is provided for each transducer. The difference in frequency between the reflected return ultrasonic signal and that of the reference oscillator signal is a direct measurement of a component of the football's velocity, called the doppler (or radial) velocity, toward or away from the subject transducer.

Football 71 will be in flight with a velocity 79, which is a vector quantity. Football 71 has nose 81, tail 83 and central longitudinal axis 85 which extends through nose 81 and tail 83. Football 71 will typically spiral as it is in flight, spinning around central axis 85. As football 71 moves through the air with a velocity in a particular direction, defining velocity vector 79, central axis 85 of football 71 will typically be canted to the direction in which football 71 is travelling, the direction of travel being the direction of velocity vector 79. Two angles, the pitch and the yaw, define the orientation of football 71 in the snapshot of any given moment. The pitch is measured in a vertical plane and defines the angle between central axis 81 and a horizontal direction. The pitch defines the upward tilt of the ball, the difference in elevation between nose 81 and tail 83. The yaw is depicted by angle 89, which is measured in a horizontal plane and defines the angle between central axis 81 and a projection of velocity vector 79 into the horizontal plane. Yaw angle 89 defines the angle at which the central axis 85 of football 75 is rotated about a vertical axis from the direction of travel of football 71.

Figure 4:
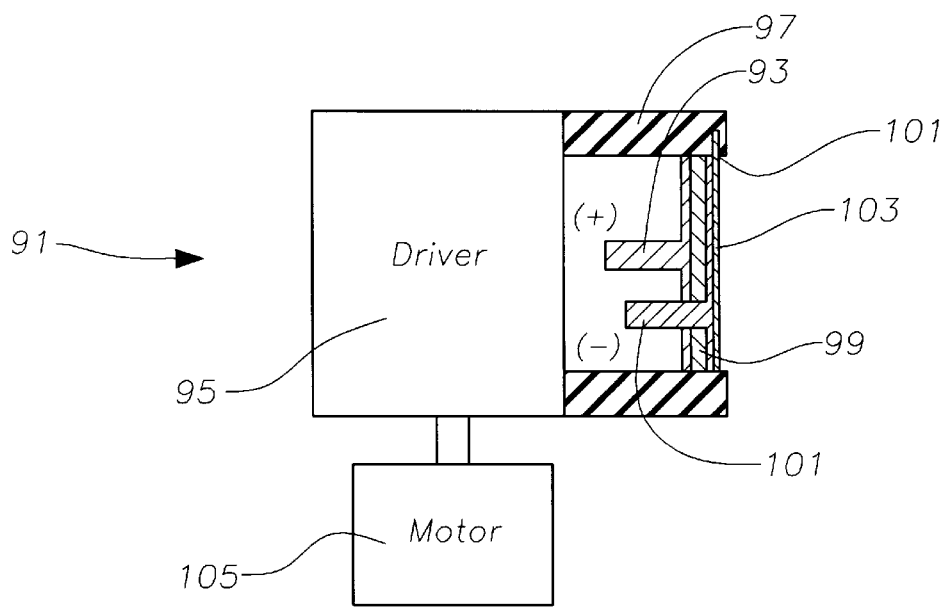
FIG. 4 is a schematic diagram depicting an ultrasonic transducer and stepper motor for use in the present invention.

Referring to FIG. 4, a schematic diagram depicts sonic transducer 91, which is one of sonic transducers 33, 35. Sonic transducer 91 includes sonde section 93 and driver 95. Driver 95 includes the electrical components for driving or powering sonde section 93, such as relays and clamping circuits. Driver 95 also includes a variably adjustable, from one (1) to three (3) miliseconds, internal timing gate delay which provides an adjustable dead time after the end of a sonic pulse over which sonic transducer 91 will not listen for return sonic signals. Sonde section 93 includes housing 97 within which is mounted piezoelectric crystal 99, which is preferably a ceramic disc formed of lead zirconate titanate, quartz crystals, or other suitable material with piezoelectric properties. Electrical contacts 101 electrically connect across piezoelectric crystal 99. Piezoelectric crystal 99 preferably has a shape of a round disc. Electrical contacts 101 are connected to the edges of piezoelectric crystal 101. Diaphragm 103 is a thin disc made of gold or other suitable materials. Diaphragm 103 extends across one of the flat, end surfaces, of piezoelectric crystal 99. When piezoelectric crystal 99 is operated to emit or listen for ultrasonic vibrations, diaphragm 103 will transmit the vibrations between transducer 91 and the air adjacent to transducer 91.

Sonic transducer 91 is mounted to stepper motor 105, which is schematically depicted in FIG. 4. Stepper motor 105 is preferably computer controlled for selectively aiming transducer 91 in selected direction, to align the field of view for sonic transducer 91 with the field of view for others of transducers 33, 35 to define regions of overlap in which movement of a football is detected. Sonic transducers 33, 35 may be selectively aimed in selected directions depending upon whether the kicker or quarterback is utilizing the simulator, or to change the regions of overlap when a ball is in flight to detect the ball at different positions. Different groups of transducers 33, 35 may simultaneously be aimed to form different regions of overlap by stepper motors 37 for simultaneously detecting motion in the different regions. The portion of transducers 33, 35 which are aimed at the same region of overlap will be used to triangulate the position, orientation and velocity components for the ball.

Figure 5:
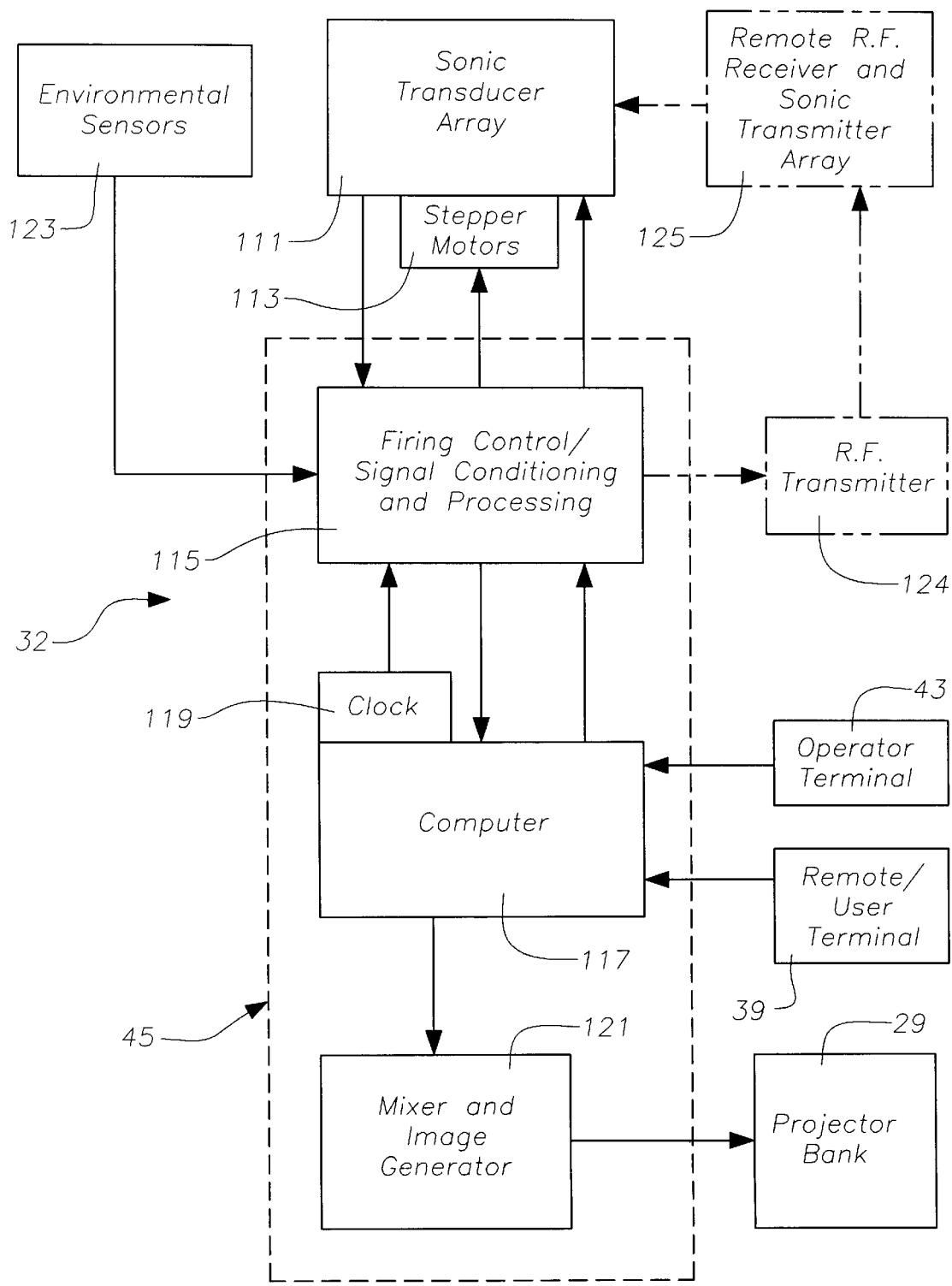
FIG. 5 is a block diagram schematically depicting the operational components of the present invention.

FIG. 5 is a block diagram which schematically represents the sonic tracking system 32 of sport simulation trainer 11. Sonic tracking system 32 detects and tracks the position and motion of objects, such as training players and the football, within actual playing area 17 (shown in FIG. 1). A sonic transducer array 111 includes sonic transducers 33, 35, which are spaced apart around the perimeter of gallery 13 (shown in FIG. 1) and mounted to stepper motors 113. Stepper motors 113 include stepper motor 105 (shown in FIG. 4).

Data processing system 45 includes firing control, signal conditioning and the processing I/O board 115. Preferably, I/O board 115 will be provided by National Instruments of Austin, Texas, having model number ATMIO 16E-2, which is a sixteen channel single ended multiplexing Input/Output board. In the current design, several of Input/Output boards 115 will be provided. Data processing system 45 further includes host computer 117, which is preferably provided by Silicon Graphics, Inc., of Mountain View, Calif. Host computer 117 is an ONYX RealityEngine$^2$, number R-48804-RERM5-B. Host computer 117 includes an internal clock 119 which generates a time signal for both computer 117 and I/O board 115. This time signal provides an actual reference time, which is used by I/O board 115 to synchronize its own internal clock with that of host computer 117. I/O board 115 time stamps all inputs and outputs to and from I/O board 115 with the actual time of occurrence of the input or output as provided by the internal clock of board 115.

Data processing system 45 further includes mixer and image generator 121, which is a plurality of video cards mounted within host computer 117. Mixer and image generator 121 provides six (6) separate video image output signals to each of six video projectors 31. The six (6) separate video signals comprise three (3) distinct video signals, one displayed on each of view screen 23, 25 and 27 (shown in FIG. 1). Each one of the three (3) distinct video signals are emitted in duplicate as two separate video outputs for passing directly to two of video projectors 21 which are grouped as a pair for separately projecting duplicate video images onto a single one of view screens 23, 25 and 27 (shown in FIG. 1). The video outputs incorporate both the view of the simulated playing field as it would appear behind the video wall 21 (shown in FIG. 1), the simulated images of linemen, receiver and defensive backs reacting to the position of a quarterback, the simulated image of the football following the trajectory determined by data processing system 45, and images of simulated down field players responding to the trajectory of the football.

Operator control panel 43 is connected directly to host computer 117. Remote user terminal 39 is also connected directly to host computer 117. Environmental sensors 123 are provided within gallery 13 for detecting environmental parameters such as the temperature, relative humidity or dew point, and barometric pressure. Temperature is used in calibrating transducers 33, 35. Additionally, wind speed and direction information may also be included if such conditions are simulated within playing area 17.

Radio frequency transmitter 124 and remote radio frequency receiver and sonic transmitter array 125 are depicted in phantom in FIG. 5, since they are optional. Radio frequency transmitters 124 and transmitter array 125 are provided for detecting all motion parameters of a football, including the spin of football 71 around central axis 85 (shown in FIG. 3). Sonic transmitter array 125 includes separate transmitters mounted within the football, preferably interiorly spaced apart around the periphery of the football such that the transverse and longitudinal axes of the football are uniquely defined. Each sonic transmitter of array 125 will emit a burst of sonic signals at a different ultrasonic frequency from the others of array 125 when a radio frequency (R.F.) pulse is detected. Host computer 117 will direct the firing control I/O 115 to cause radio frequency transmitter 124 to emit two or more short bursts of a radio frequency signal over a short time interval to active transmitter array 125.

The short R.F. bursts from transmitter 124 will be detected by R.F. receiver and sonic array 125, and cause each of the transducers of sonic array 125 to emit ultrasonic bursts, separated by short time intervals. Transducers 33, 35 will then receive the ultrasonic bursts, which will then be analyzed to determine the actual spin of the football. The sonic transducers of sonic array 125 are preferably selected to emit at separate frequencies, which are the same as some of the frequencies at which transducers 33, 35 operate. When the transducers of sonic array 125 are operated, transducers 33, 35 will be continuously operated as receiver transducers, in a continuous detection mode for receiving sonic signals from transducers array 125. Transducers 33, 35 may also be operated in pulse-echo mode to emit and then receive sonic signals over different time intervals than those time intervals over which transducer array 125 is selectively operated. The sonic signals received from bursts of sonic array 125 will then be analyzed to determine position, orientation, velocity and spin of the football.

It should be noted that the spin of the football is considered to be a factor of a third order of magnitude in the trajectory determination for the football. As such, differences in spin will have relatively little effect on the computed trajectory of a football, as compared to the other positional and directional information determined from sonic transducer array 111. In the preferred embodiment, radio frequency transmitter 124 and remote radio frequency receiver and transmitter array 125 are not included, but rather an averaged value of the spin for quarterbacks is used as a default for computing the trajectory of the football.

Figure 6:
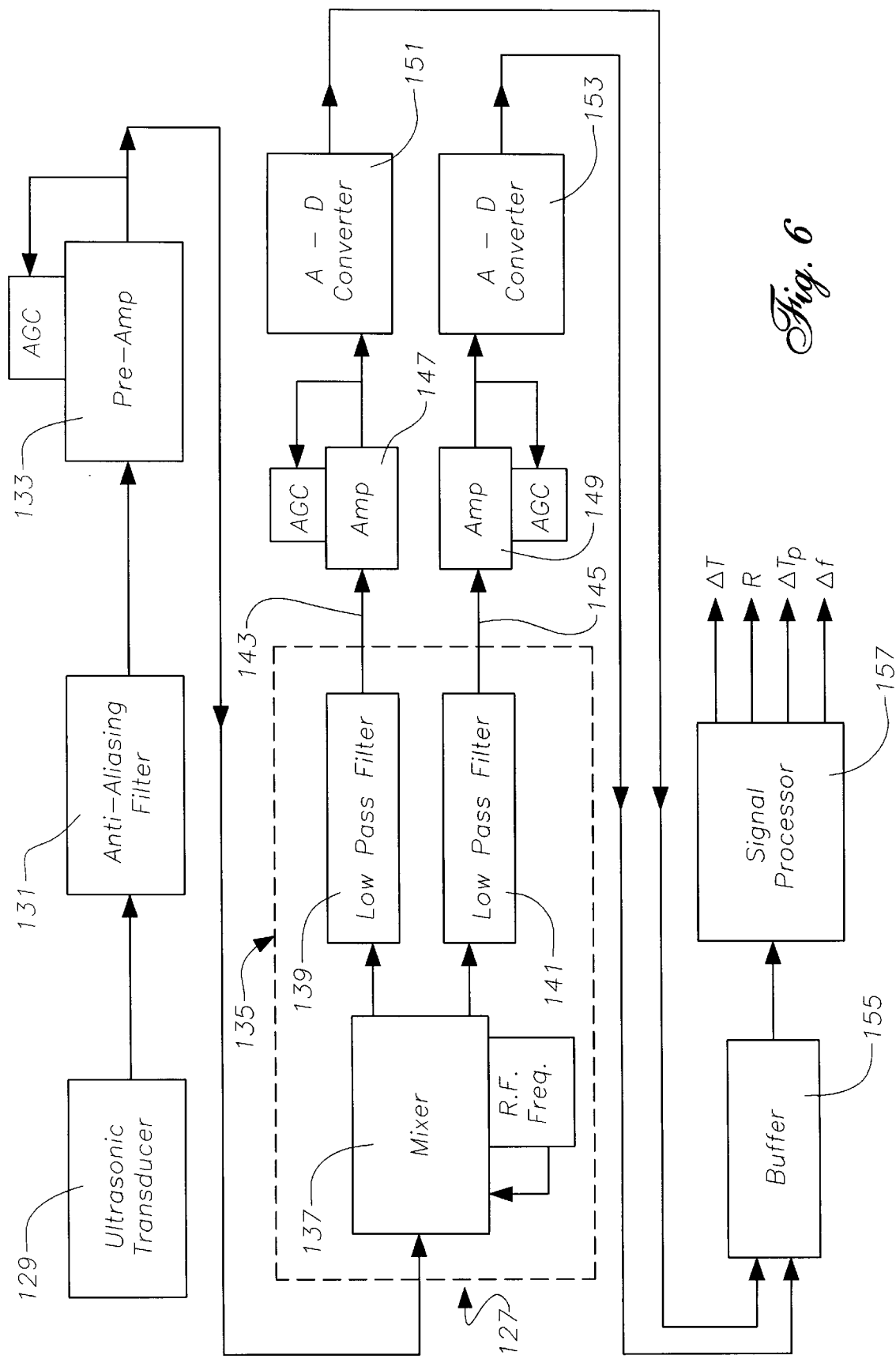
FIG. 6 is a block diagram depicting the firing control, signal conditioning and processing input/output of FIG. 5 connected to one of the ultrasonic transducers of the present invention.

FIG. 6 is a block diagram which schematically depicts a single ultrasonic transducer 129 and the signal processing portion 127 of I/O board 115 for processing the return signals detected by transducer 129. The same I/O board 115 is used to process detected return signals when transducer 129 is operated in both the short burst pulse-echo mode and in the continuous wave (cw)-doppler mode. A separate signal processing portion 127 is frequency matched with and provided for each one of the sonic transducers of arrays 33, 35, and it only processes the output, the return sonic signals, from that one sonic transducer. Signal processing portion 127 includes an anti-aliasing filter 131, which provides low pass filtering. The output from anti-aliasing filter 131 is connected to pre-amplifier 133, which has an automatic gain control. The output from pre-amplifier 133 is passed to matched filter 135.

Matched filter 135 is a passive processing filter which includes mixer 137 and low pass filters 139, 141. Mixer 137 has an internal oscillator which generates a reference frequency which corresponds to the ultrasonic emission frequency of the particular one ultrasonic transducer 129 which mixer 137 is matched with to process. For example, if ultrasonic transducer 129 is designed for emitting ultrasonic signals at 40 khz, a reference frequency of 40 kHz is generated within mixer 137. Two outputs from mixer 137 go through low pass filters 139, 141, respectively. The output from low pass filter 139 is an in-phase signal 143, and the output from low pass filter 141 is quadrature signal 145. Quadrature signal 145 is ninety (90) degrees out of phase with in-phase signal 143. In-phase signal 143 is passed to amplifier 147, and quadrature signal 145 is passed to amplifier 149.

Still referring to FIG. 6, the outputs for amplifiers 147, 149 are passed to analog to digital converters 151, 153, respectively. The digital signals from A–D converters 151, 153 are passed to a buffer 155, and then into signal processor 157.

Signal processor 157 receives the digital return signals from buffer 155, and determines a value of the transit time ($\Delta T$) for a return sonic signal. From the transit time ($\Delta T$), the range (R) of the football from transducer 129 is calculated. Signal processor 157 determines the velocity of the football from a differential pulsewidth measurement which compares the change in the pulsewidth, or burst duration of the return signal, as compared to the pulsewidth, or burst duration, of the emitted signal, which is discussed above as being approximately 350 microseconds in duration. This differential pulsewidth is denoted $\Delta Tp$ in FIG. 6. Larger values for $\Delta Tp$ correspond to football velocity components, relative to sonic transducer 129, moving away from sonic transducer 129. Smaller values for $\Delta Tp$ correspond to football velocity components, relative to sonic transducer 129, travelling toward sonic transducer 129. $\Delta Tp$ may be used to calculate the components of the velocity of the football in relation to sonic transducer 129. Signal processor 157 also determines the velocity of the football from a measurement of the frequency shift ($\Delta f$), between the transmitted signal and the return signal. The amount of this frequency shift, also known as doppler shift, is directly related to the radial velocity of the football relative to the transducer. The frequency shift ($\Delta f$) is derived from quadrature signal 145. Thus, the range (R), the transit time ($\Delta T$), the differential pulsewidth ($\Delta Tp$) and the doppler shift ($\Delta f$) are determined for each of the detected return sonic pulses. The data signal output of signal processor 157 is then downloaded to computer 117 (shown in FIG. 5).

When transducer 129 is operated in continuous wave (cw)-doppler mode for determining the doppler frequency shift ($\Delta f$), only quadrature signal 145 is analyzed to determine $\Delta f$. The continuous wave-doppler mode provides more accurate determination of the doppler frequency shift ($\Delta f$). The continuous wave-doppler mode $\Delta f$ data is redundant with the data detected during the short burst pulse-echo mode, and is used to improve the detection accuracy of the trajectory of the football.

Referring back to FIG. 5, computer 117 then processes the data for $\Delta T$, R, $\Delta Tp$ and $\Delta f$ from each sonic transducer of arrays 33, 35. Computer 117 will use selected groupings of sonic transducers 33, 35 from which to triangulate the position, orientation and velocity components of the ball. Redundant information is also provided by having several measurements from several of the various groupings of transducers, and is also statistically analyzed to improve the accuracy of sonic tracking system 32.

Figure 7A:
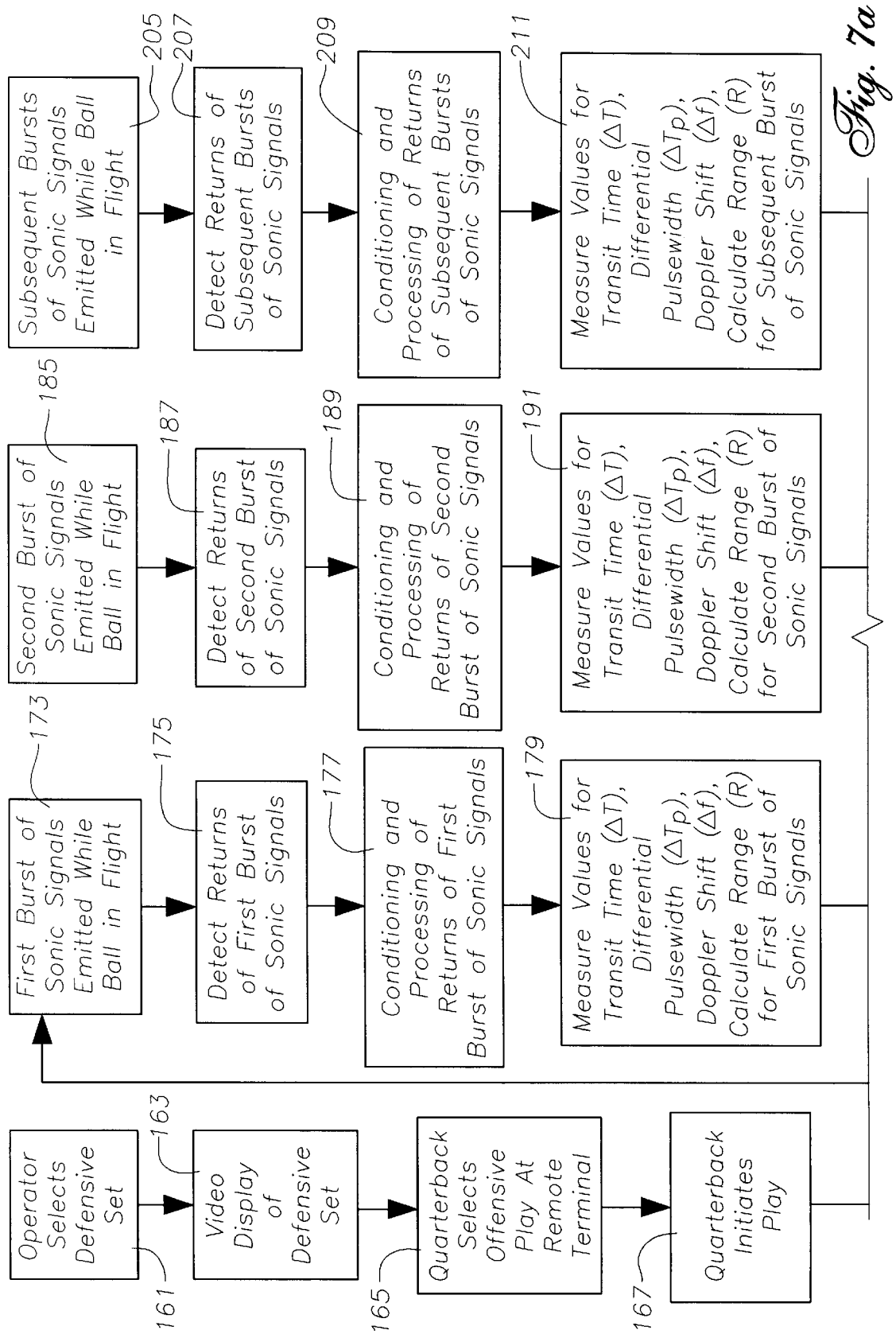
FIG. 7 is a block diagram depicting operation of the football simulation trainer of FIG. 1.
Figure 7B:
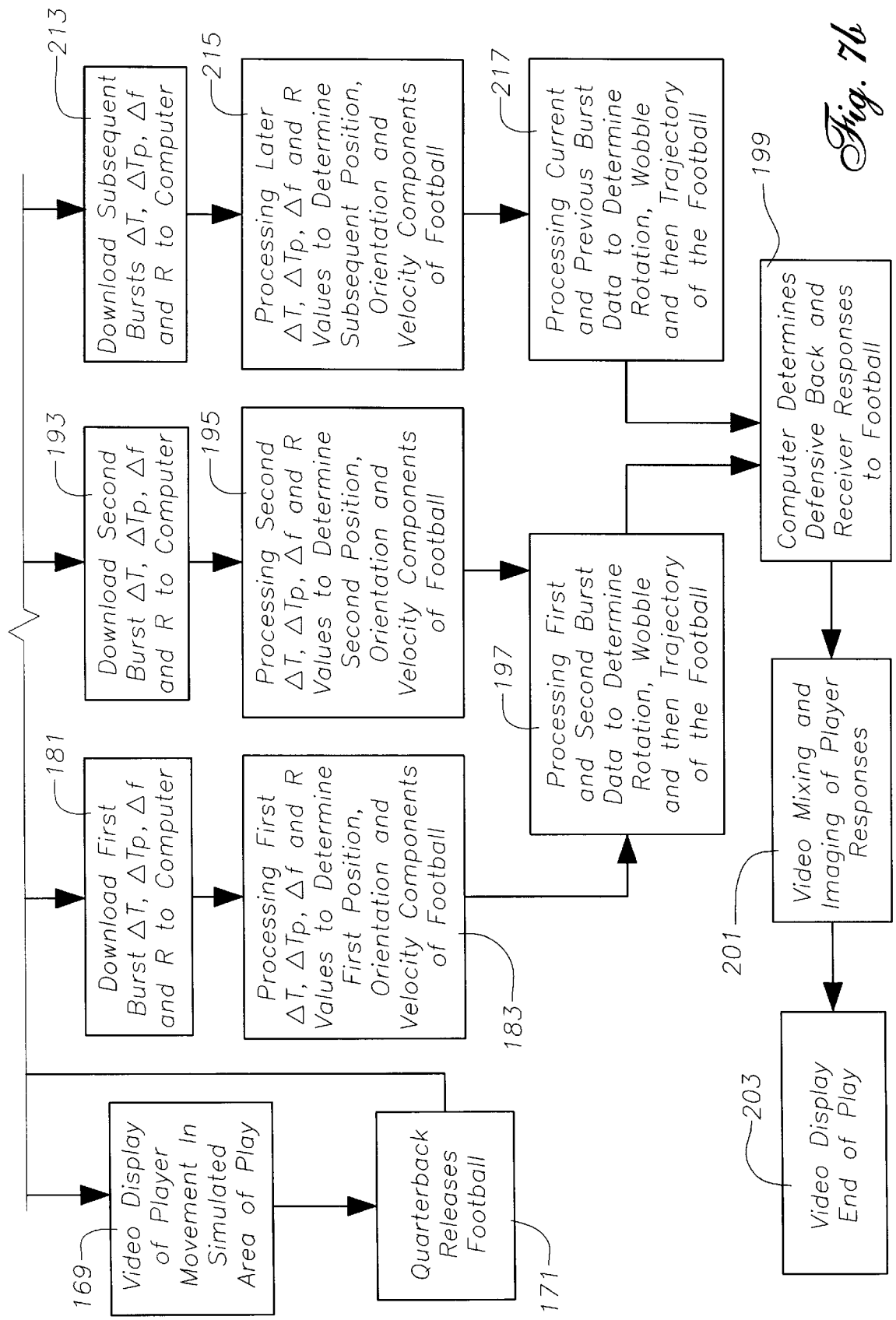

FIG. 7 is a block diagram depicting operation of football interactive simulation trainer 11 in the short burst pulse-echo mode. Block 161 depicts a simulation trainer operator selecting a defensive set, calling a defensive play. Typically, the operator will be a coach who is training either a quarterback or a place kicker. Once the operator selects a defensive set, then the video display of the defensive set will be displayed on video wall 23, as depicted in block 163. The quarterback then selects an offensive play at the remote terminal 39, as depicted in block 165. Then in step 167, the quarterback initiates the play. As soon as the play is initiated, the video display of player movement in simulated area of play 19 will be shown on the video wall as depicted in block 169. Step 171 depicts a quarterback releasing the football.

Block 173 represents the step of emitting the first burst of sonic signals while the ball is in flight. The operator may provide manual input of the play starting to determine when the first sonic burst occurs, or the system may continuously operate for detecting motion once the defensive and offensive plays are selected and motion is detected to determine when the play has begun. Then in block 175, the returns of the first sonic signal bursts are detected.

In the step depicted in block 177, the return sonic signals of the first bursts are conditioned and processed. Block 179 depicts the step of measuring values for the transit time ($\Delta T$) and the differential pulsewidth ($\Delta Tp$), doppler shift ($\Delta f$) and calculating the range (R) of the ball in relation to each of the separate transducers. Then, in step 181, the transit time ($\Delta T$), differential pulsewidth ($\Delta Tp$), doppler shift ($\Delta f$) and range (R) are downloaded to computer 117. In the step depicted in block 183, computer 117 processes the downloaded data to triangulate and then determine the first position, orientation and velocity components of the ball.

Then a short time later, a second burst of sonic signals are emitted while the ball is in flight, depicted as block 185. Returns of the second burst of sonic signals are detected in block 187. Conditioning and processing of returns for second sonic signals occur in the step of block 189. Then, from the returns for the second sonic signals, the transit time ($\Delta T$), differential pulsewidth ($\Delta Tp$), doppler shift ($\Delta f$) and range (R) are measured and calculated for the sonic returns of the second burst from each of the sonic transducers. The data determined in the step of block 191 is then downloaded to computer 117 in the step of block 193. In block 195, computer 117 then processes the second set of data and determines a second position, orientation and velocity for the football.

Then, in the step of block 197, computer 117 compares the data from the first and second bursts to compare the position, orientation and velocity components computed in block 183 to those computed in 195. From this information, computer 117 determines the rotation, as associated with change in pitch, and the wobble, as associated with change in yaw. Computer 117 also updates the calculated trajectory of the ball. A default value of the spin of the football around a central longitudinal axis for the football is input using an average spin value for quarterbacks. Using the default value for the spin, and the determined values for the velocity components, rotation (pitch rate) and wobble (yaw rate), computer 117 will update the trajectory of the ball taking into account aerodynamic factors. Wind velocity, direction and altitude above sea level for particular stadiums may also be input into computer 117 for including in the trajectory calculations.

The football's trajectory determined in block 197 is used in block 199 to determine down field defensive back and receiver responses. The responses of these down field players are determined by providing artificial intelligence, and may also include providing the different down field players with the physical abilities of actual players of opponents and receivers in the games being simulated. In the step of block 201, video mixing and imaging is performed to provide the six video signals for projection onto video wall 21. Then, in step 203, the video signal is projected onto video wall 21, and training quarterbacks and kickers may view the simulation to learn how the simulated defensive backs and receivers responded, and whether the field goal attempt was successful, respectively.

Block 205, in FIG. 7, depicts later sonic bursts which may be emitted after the second sonic burst for updating trajectory data while the ball is still in flight in actual playing area 17. In block 207 the returns of the later sonic burst are detected, and then in block 209 are conditioned and processed. Block 211 depicts the step of measuring subsequent transit times ($\Delta T$) and differential pulsewidth ($\Delta Tp$), doppler shift ($\Delta F$) and calculating ranges (R) for the return signals from the later sonic bursts. This data for each of the sonic transducers is then downloaded in step 213 for processing. In step 215 the computer processes the downloaded data to determine later positions, orientations, and velocity components. Then, in the step depicted in block 217, the subsequent sonic burst data is compared to the sonic burst data from previous bursts, such as the first and second bursts. Then the corrected rotation, wobble and trajectory data is processed in block 199 to update defensive back and receiver responses, and the video display steps of blocks 201 and 203 are again performed. Operation of the football interactive simulation trainer for place kicker training parallels that described for quarterback training in FIG. 7 with the exception that the play is initiated by the kicker.

Operation of certain ones of sonic transducers in sonic tracking systems 32 in the continuous wave-doppler mode parallels that described in FIG. 7 for the transducers operating in pulse-echo mode. The return signals will be processed in a similar fashion to that shown in FIG. 7 for the short burst pulse-echo mode. However, in continous wave-doppler mode only the doppler shift ($\Delta F$) will be measured, providing a direct measurement of the velocity components of the football relative to each of the subject transducers. The measured velocity components are then combined by data processing systems 45 to determine the velocity vector direction and magnitude of the football within actual playing area 17. The measured velocity components are then used to calculate position. The measured velocity components and calculated positions from continuous wave-doppler mode operation are redundant with the velocities and positions calculated in the pulse-echo mode operation therby improving detection accuracy of the football trajectory.

Figure 8:
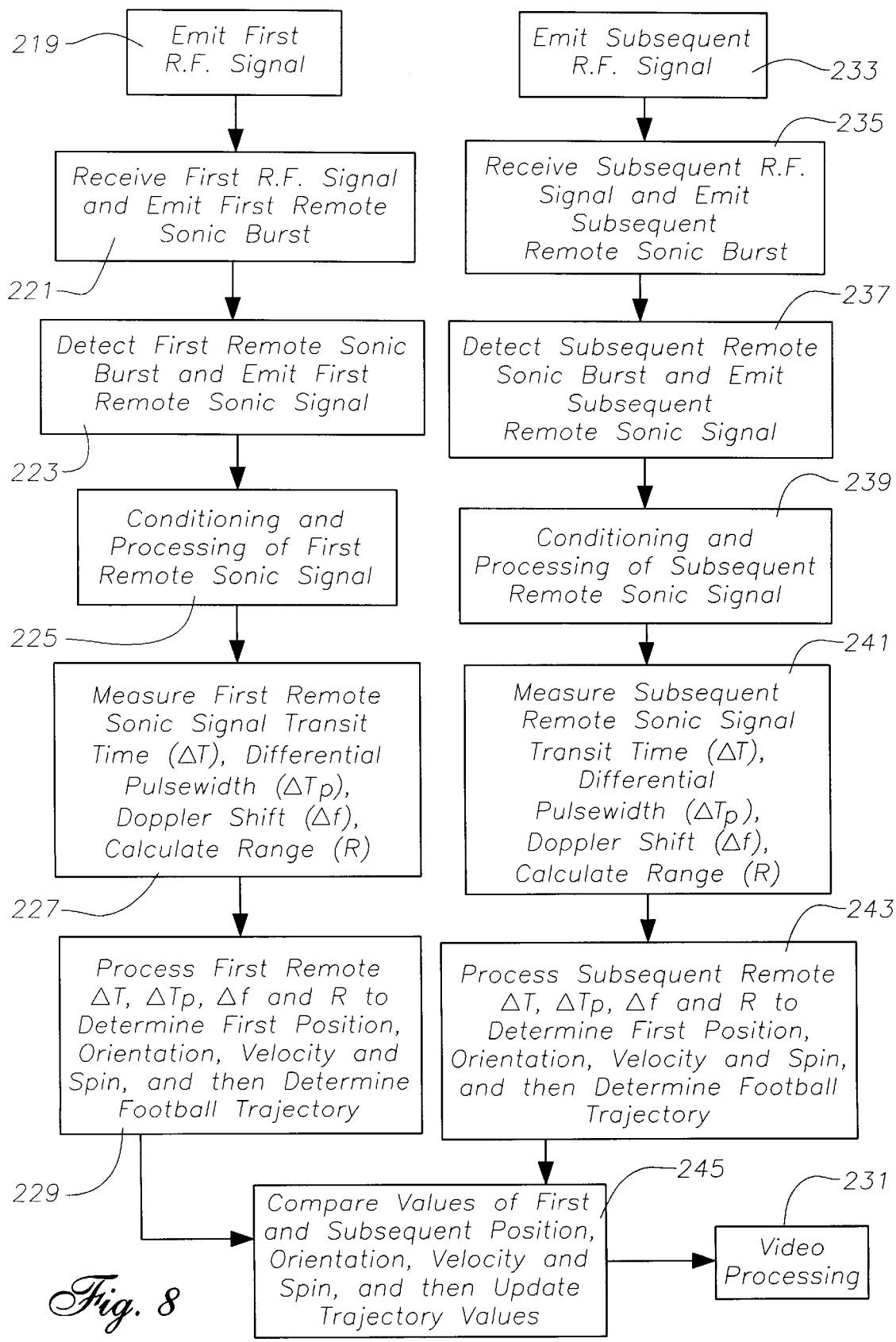
FIG. 8 is a block diagram depicting operation of a remote sonic transmitter array for mounting within a football according to the present invention.

FIG. 8 is a block diagram depicting the steps for an alternative embodiment of the present invention, incorporating the radio frequency transmitter 124 and football mounted remote radio frequency receiver and sonic transmitter array 125, which are depicted in phantom in FIG. 5. As discussed above, the sonic transducers for remote sonic transmitter array 125 will be spaced apart and mounted interiorly within a football. In the step depicted in block 219, a short burst radio frequency signal will be emitted when the ball is in flight. In block 221, the radio frequency receiver mounted within the ball will detect the radio frequency signal, and then the remote sonic array mounted within the ball will emit a short burst of ultrasonic signals of different frequencies for different sonic transducers.

The portion of transducers 33, 35 of sonic transducer array 111 (depicted in FIG. 5) which operate at the same frequencies as the transducers of remote array 125 will not transmit in a pulse-echo mode over the time interval of the sonic burst from remote array 125, but rather will listen to detect the sonic signals from the ball mounted transducer array 125. Those of transducers 33, 35 which operate at the same frequencies as the sonic transducers of ball mounted array 125 will listen for sonic signals of their operating frequency. The sonic bursts of the different frequencies are detected in block 223, and then signal conditioning and processing of each of the sonic signals is performed in block 225. Then, in block 227, the transit times (ΔT), doppler shift (Δf) and differential pulsewidth (ΔTp) are measured, and the ranges (R) are calculated for each of the detected sonic signals. The values for ΔT, ΔTp, Δf and R are then processed in step 229 to determine the actual football spin, rotation and wobble, and then the trajectory is calculated. In block 231, video processing occurs to output video signals for display on the video wall 21.

Then a short time later, as depicted in the step of block 233, a second radio frequency signal is emitted. Alternatively, a short time delay may be provided within remote sonic array 125 to emit a second burst without requiring a second radio frequency signal. Ball mounted transducer array 125 then emits a second set of bursts of ultrasonic signals as depicted in the step of block 235. In the step of block 237, the emitted ultrasonic signals are detected, and in block 239 the detected sonic signals are conditioned and processed. In block 241, the transit time (ΔT), differential pulsewidth (ΔTp) and doppler shift (Δf) are measured, and the range (R) is calculated. In block 243, the sonic signal data is processed to determine position, orientation, velocity, spin and the football's trajectory. Next, in block 245, the values calculated in step 229 and 243 are compared to determine the changes in position and the velocity components for the football. Redundant information is provided so that statistical sampling and processing techniques may be applied to enhance the accuracy of ultrasonic tracking system 32.

The present invention provides several advantages over prior art simulation trainers. The sports simulation trainer of the present invention provides a true perspective interactive simulation of football games for training quarterbacks and kickers. A video wall provides realistic images of simulated down field players so that a quarterback can practice reading defenses against which he will later actually play. The simulated players are driven by artificial intelligence so that linemen, defensive backs and receivers will react to the detected positions of training quarterbacks and kickers, and the detected trajectory of a pass. The integrated multi-frequency, narrow band ultrasonic radar tracking system of the present invention detects position and velocity, as well as such critical aerodynamic factors as spiral or spin about a rotational axis, wobble and rotation of the football, which is oblong in shape.

Although the invention has been described with reference to specific embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

We claim:

1. A sport simulation trainer for detecting movement of an object in an actual playing area and simulating the sport in response to detecting the movement of the object, the sport simulation trainer comprising in combination:

a video display wall having a view screen for displaying visual images of a simulated playing area;

a field of play including both the actual slaying area, which extends forward of the video display wall, and the simulated playing area, which extends rearward of the video display wall;

a sensing array having a plurality of sensors which are spaced apart around the actual slaying area and directed to establish a region of overlap of the fields of view of the sensors for emitting energy waves into the actual slaying area, detecting reflected returns of the energy waves being reflected from the object within the region of overlap in the actual playing area, and then emitting data signals in response to detecting the reflected returns;

a data processing system connected to the sensing array for receiving the data signals emitted in response to the reflected returns, processing the data signals to determine a trajectory for the movement of the object, projecting the trajectory into the simulated playing area, and generating the visual images of the simulated playing area and movement of the object through the playing area for display on the view screen of the video display wall;

means for determining positions of a training player in the actual playing area during a simulated play; and wherein the data processing system determines the training players perspective views of the simulated playing area from the positions in the actual playing area, and selects lines of sight and values of magnification of the visual images to display the perspective views of the simulated playing area to the training player at respective ones of the positions.

2. The sport simulation trainer according to claim 1, wherein the data processing system compares frequencies of selected ones of the reflected returns of the energy waves to at least one selected frequency at which the energy waves are emitted to determine a velocity component for the object relative to a direction of travel for the energy waves.

3. The sport simulation trainer according to claim 1, wherein the energy waves are ultrasonic signals which are emitted into air, and the sensing array comprises:

a sonic transducer array for emitting the ultrasonic signals into the actual playing area, detecting the reflected returns of the ultrasonic signals being reflected from the object within the actual playing area, and emitting the data signals in response to detecting the reflected returns of the ultrasonic signals.

4. The sport simulation trainer according to claim 1, wherein the energy waves are ultrasonic signals which are emitted into air, and the sensing array comprises:

a plurality of sonic transducers spaced apart around the actual playing area and directed to face in selected directions to establish the region of overlap of fields of view of the sonic transducers;

different ones of a first portion of the sonic transducers being selectively disposed about the actual playing area for emitting the ultrasonic signals into the actual playing area at different ultrasonic frequencies; and at least some of the sonic transducers being selectively disposed about the playing area to detect the reflected returns of the ultrasonic signals being reflected from the object within the actual playing area, and then to emit the data signals in response to detecting the reflected returns of the ultrasonic signals.

5. A football simulation trainer for detecting movement of a football in an actual playing area and simulating football plays in a simulated playing area in response to detecting the movement of the football, the football simulation trainer comprising in combination:

a video display wall having a view screen for displaying visual images of football plays in the simulated playing area;

a field of play including both the actual playing area, which extends forward of the video display wall, and the simulated playing area, which extends rearward of the video display wall;

a plurality of sonic transducers spaced apart around the actual playing area for emitting ultrasonic signals into a region of overlap of fields of view of the sonic transducers in the actual playing area, detecting returns of the ultrasonic signals from within the actual playing area, and emitting data signals in response to detecting the returns of the ultrasonic signals;

a data processing system connected to the plurality of sonic transducers for receiving the data signals emitted in response to the returns, processing the data signals to determine a trajectory for the movement of the football within the actual playing area, projecting the trajectory into the simulated playing area and generating trajectory data corresponding to the trajectory of the football;

a mixer and image generator connected to the data processing system and the video display for generating video signals for display on the view screen as the visual images which simulate the football plays and the trajectory of the football within the simulated playing area in response to the trajectory data;

means for tracking positions of a training player in the actual playing area during the football plays; and wherein the data processing system determines the training players perspective views of the simulated playing area from the positions in the actual playing area, and selects lines of sight and values of magnification of the visual images to display the perspective views of the simulated playing area to the training player at respective ones of the positions.

6. The football simulation trainer according to claims 5, wherein each of the sonic transducers both emits some of the ultrasonic signals into the region of overlap of the fields of view of the sonic transducers and then detects some of the returns of the ultrasonic signals from the region of overlap of the fields of view.

7. The football simulation trainer according to claim 5, wherein different ones of the sonic transducers emit ultrasonic signals at different fixed ultrasonic frequencies from others of the sonic transducers to identify which of the different ones of the sonic transducers emitted various ones of the ultrasonic signals detected as returns.

8. The football simulation trainer according to claim 5, wherein frequencies of the returns of the ultrasonic signals are compared to a frequency at which at least some of the ultrasonic signals are emitted to determine a velocity of the football relative to a direction of travel of the ultrasonic signals.

9. The football simulation trainer according to claim 5, wherein:

the plurality of sonic transducers are spaced apart around the perimeter of the actual playing area and selectively grouped into sets of sonic transducers;

each of the sets of sonic transducers is selectively directed at different portions of the actual playing area to define separate ones of the regions of overlap of the fields of view of the sonic transducers which correspond to different ones of the sets of sonic transducers; and the data processing system separately processes the data signals according to the selective grouping of the sets of sonic transducers.

10. A method for sports simulation training of the type in which the movement of an object within an actual playing area is detected and simulated within a simulated playing area in response to detecting the movement of the object, the method comprising the steps of:

providing a video display for displaying visual images of a sports play in the simulated slaving area, and a field of play which includes both the actual playing area, which extends forward of the video display, and the simulated playing area, which extends rearward of the video display:

further providing a plurality of sonic transducers for emitting ultrasonic signals and for detecting reflected returns of the ultrasonic signals;

spacing apart the sonic transducers, directed to face in selected directions to establish a region of overlap of fields of view for the sonic transducers within the actual field of play within which the movement of the object is being determined;

driving at least a first portion of the sonic transducers to emit the ultrasonic signals within the region of overlap of the fields of view;

detecting returns of the ultrasonic signals from within the region of overlap of the fields of view with at least a second portion of the sonic transducers, and emitting data signals in response to the returns of the ultrasonic signals; processing the data signals emitted in response to the returns of the ultrasonic signals to determine a trajectory for the movement of the object within the field of play;

projecting the trajectory into the simulated slaying area and generating trajectory data corresponding to the trajectory of the object in the field of play;

generating video signals and providing the video signals which provide the visual images to the video display to simulate the sports play and the movement of the object within the simulated playing area in response to the trajectory data;

tracking positions of a training player within the actual playing area during the sports play;

processing the position of the training player to determine the training players perspective views of the simulated playing area from the positions in the actual playing area; and selecting lines of sight and values of magnification of the visual images to display the perspective views of the simulated playing area to the training player at respective ones of the positions.

11. The method according to claim 10, further comprising the steps of:

processing a first set of the data signals to determine first distances between the object and the sonic transducers;

comparing the first distances between the object and the sonic transducers to determine a first position for the object within the region of overlap of the fields of view;

processing a second set of the data signals to determine second distances between the object and the sonic transducers;

comparing the second distances between the object and the sonic transducers to determine a second position for the object within the region of overlap of the fields of view; and then comparing the first and the second positions of the object to determine the movement of the object.

12. The method according to claim 10, further comprising the steps of:

processing the data signals to determine first distances between the object and the sonic transducers;

comparing the first distances between the object and the sonic transducers to determine a position for the object within the region of overlap of the fields of view;

further processing the data signals to determine differences in frequencies between at least part of the returns of the ultrasonic signals and at least some of the ultrasonic signals emitted; and determining relative velocities between the object and the sonic transducers to determine a velocity for the object within the region of overlap of the fields of view.

13. The method according to claim 10, wherein different ones of the sonic transducers emit the ultrasonic signals at different fixed frequencies from the others of the sonic transducers to indicate which of the sonic transducers emitted particular ones of the ultrasonic signals.

* * * * *